US008725585B1

(12) United States Patent
Kay et al.

(10) Patent No.: US 8,725,585 B1
(45) Date of Patent: *May 13, 2014

(54) AUTOMATIC VETTING OF WEB APPLICATIONS TO BE LISTED IN A MARKETPLACE FOR WEB APPLICATIONS

(75) Inventors: Erik Kay, Belmont, CA (US); Aaron Boodman, San Francisco, CA (US); Lei Zheng, Saratoga, CA (US); Michael Noth, Bothell, WA (US)

(73) Assignee: Google Inc., Mountain View, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/110,901

(22) Filed: May 18, 2011

Related U.S. Application Data

(60) Provisional application No. 61/346,013, filed on May 18, 2010, provisional application No. 61/345,999, filed on May 18, 2010, provisional application No. 61/346,000, filed on May 18, 2010.

(51) Int. Cl.
  *G06Q 30/00* (2012.01)

(52) U.S. Cl.
  USPC .................................. 705/26.1; 705/27.1

(58) Field of Classification Search
  USPC ............................. 705/26.1, 27.1
  See application file for complete search history.

(56) References Cited

U.S. PATENT DOCUMENTS

| 7,526,810 B2 * | 4/2009 | Lalonde et al. ............... 726/24 |
| 8,255,280 B1 | 8/2012 | Kay et al. |
| 2005/0257209 A1 | 11/2005 | Adams et al. |
| 2008/0060083 A1 * | 3/2008 | Koved et al. ................... 726/27 |
| 2010/0281311 A1 | 11/2010 | Gao et al. |
| 2011/0113453 A1 | 5/2011 | Ralston et al. |

OTHER PUBLICATIONS

Internet fixes, Zetter, Kim; Tweney, Dylan F. PC World21. 4 (Apr. 2003): 80-90, downloaded from ProQuestDirect on the Internet on Nov. 28, 2012, 6 pages.*
Notice of Allowance for U.S. Appl. No. 13/246,650, mailed Apr. 27, 2012, 9 pages.
Non-Final Office Action for U.S. Appl. No. 13/246,650, mailed Dec. 29, 2011, 13 pages.
Veracode Named "Cool Vendor" by Leading Analyst Firm, Anonymous. Business Wire. New York: Apr. 9, 2008, downloaded from ProQuestDirect on the Internet on Apr. 22, 2012, 3 pages.

* cited by examiner

*Primary Examiner* — James Zurita
(74) *Attorney, Agent, or Firm* — Brake Hughes Bellermann LLP

(57) ABSTRACT

A computer-implemented method includes providing an online marketplace to developers of web applications that may be downloaded from the marketplace to a client computing device for execution by a browser executing on the client device and receiving a request from a party to the marketplace to list a proposed web application for sale in the marketplace. One or more processors of a computer system automatically determine the permissions requested by the proposed web application and automatically determine if the permissions match one or more predetermined permissions. If the permissions match one or more predetermined permissions, then the proposed application is flagged for a manual vetting process before listing the proposed application in the marketplace, and if they do not match, then the proposed application is listed in the marketplace without manual review of the application.

16 Claims, 8 Drawing Sheets

FIG. 7

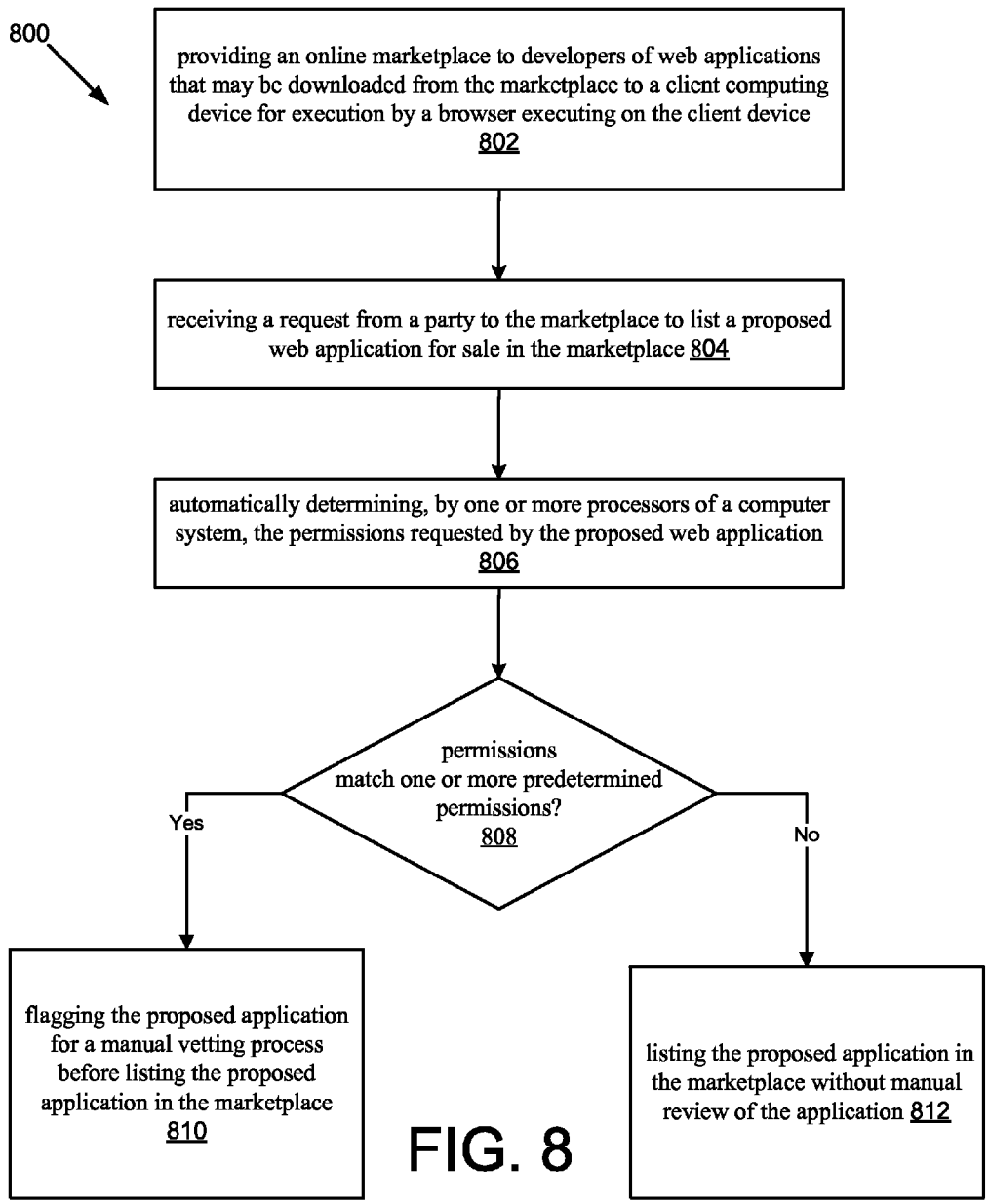

AUTOMATIC VETTING OF WEB APPLICATIONS TO BE LISTED IN A MARKETPLACE FOR WEB APPLICATIONS

CROSS REFERENCE TO RELATED APPLICATIONS

This application claims the benefit, under 35 U.S.C. §119, of U.S. Provisional Patent Application No. 61/345,999 (titled "Installable Web Applications"), U.S. Provisional Patent Application No. 61/346,000 (titled "Web Store for Digital Goods"), and U.S. Provisional Patent Application No. 61/346,013 (titled, "Chrome Extensions"), all filed May 18, 2010. The disclosures of these provisional patent applications are incorporated herein by reference in their entirety.

TECHNICAL FIELD

This disclosure relates providing web applications in a marketplace and, in particular, to the automatic vetting of web applications to be listed in a marketplace for web applications.

BACKGROUND

Digital goods, such as installable software applications, including for example installable web applications and browser extensions can be offered to users in an online marketplace. When digital goods are offered for sale in a marketplace the goods can be listed in the marketplace by a developer of the goods, and the marketplace can offer a forum to the developer within which many users can discover the developer's goods. In addition, the marketplace can collect payment for the goods from purchasers of the goods and then can pass on the payment to the developer of the digital goods.

A store operating as a marketplace has many desirable properties compared to a store operating as a seller of record or as a reseller, in which the reseller purchases goods from developers and resells them at a price determined by the reseller. A marketplace operator may have less liability for the performance of the goods that are sold and has the opportunity to be more inclusive of goods that can be offered in the marketplace. However, the marketplace operator may nevertheless want to ensure that the digital goods conform to certain quality standards and did not pose a threat to the consumers of the goods. On the other hand, the marketplace operator may want to make the process of listing a good in the marketplace as easy as possible for a developer of the good.

SUMMARY

In a general aspect, a computer-implemented method includes providing an online marketplace to developers of web applications that may be downloaded from the marketplace to a client computing device for execution by a browser executing on the client device and receiving a request from a party to the marketplace to list a proposed web application for sale in the marketplace. One or more processors of a computer system automatically determine the permissions requested by the proposed web application and automatically determine if the permissions match one or more predetermined permissions. If the permissions match one or more predetermined permissions, then the proposed application is flagged for a manual vetting process before listing the proposed application in the marketplace, and if they do not match, then the proposed application is listed in the marketplace without manual review of the application.

In another general aspect, a computer-readable storage medium has recorded and stored thereon instructions that, when executed by one or more processors of a computer system cause the computer system to provide an online marketplace to developers of web applications that may be downloaded from the marketplace to a client computing device for execution by a browser executing on the client device, receive a request from a party to the marketplace to list a proposed web application for sale in the marketplace, automatically determine the permissions requested by the proposed web application, automatically determine if the permissions match one or more predetermined permissions. If there is a match then the proposed application is flagged for a manual vetting process before listing the proposed application in the marketplace, but if there is not a match then the proposed application is listed in the marketplace without manual review of the application.

In another general aspect, an apparatus includes one or more memory devices arranged and configured to store executable code and one or more processors operably coupled to the one or more memory devices. The processors are arranged and configured to execute the code such that the apparatus performs the actions of providing an online marketplace to developers of web applications that may be downloaded from the marketplace to a client computing device for execution by a browser executing on the client device, receiving a request from a party to the marketplace to list a proposed web application for sale in the marketplace, automatically determining the permissions requested by the proposed web application, and automatically determining if the permissions match one or more predetermined permissions. If there is a match then the proposed application is flagged for a manual vetting process before listing the proposed application in the marketplace, but if there is not a match then the proposed application is listed in the marketplace without manual review of the application.

Implementations can include one or more of the following features. For example, the web application can include a web extension. The one or more predetermined permissions can include a permission to run native code as part of the execution of the web application or can include a local hardware access permission.

The manual vetting process can include manually running the proposed application and checking for malicious effects of the proposed application on a client device running the proposed application.

It can be automatically determined if code of the proposed application matches one or more known malicious code sequences, and if so, the proposed application can be flagged for a manual vetting process before listing the proposed application in the marketplace, but if the code of the proposed application does not match the one or more known malicious code sequences and if the permissions do not match the one or more predetermined permissions, the proposed application can be listed in the marketplace without manual review of the application.

It can be automatically determined if code of the proposed application matches one or more suspicious code sequences, and if so, the proposed application can be flagged for a manual vetting process before listing the proposed application in the marketplace, and if the code of the proposed application does not match the one or more suspicious code sequences and if the permissions do not match the one or more predetermined permissions, the proposed application can be listed in the marketplace without manual review of the application.

BRIEF DESCRIPTION OF THE DRAWINGS

FIG. 7 is an exemplary file containing a code snippet that may be referred to as a manifest or manifest file and that may contain metadata associated with the web application or extension application.

FIG. 8 is a flowchart of a process that implements techniques described herein.

DETAILED DESCRIPTION

Figure 1:
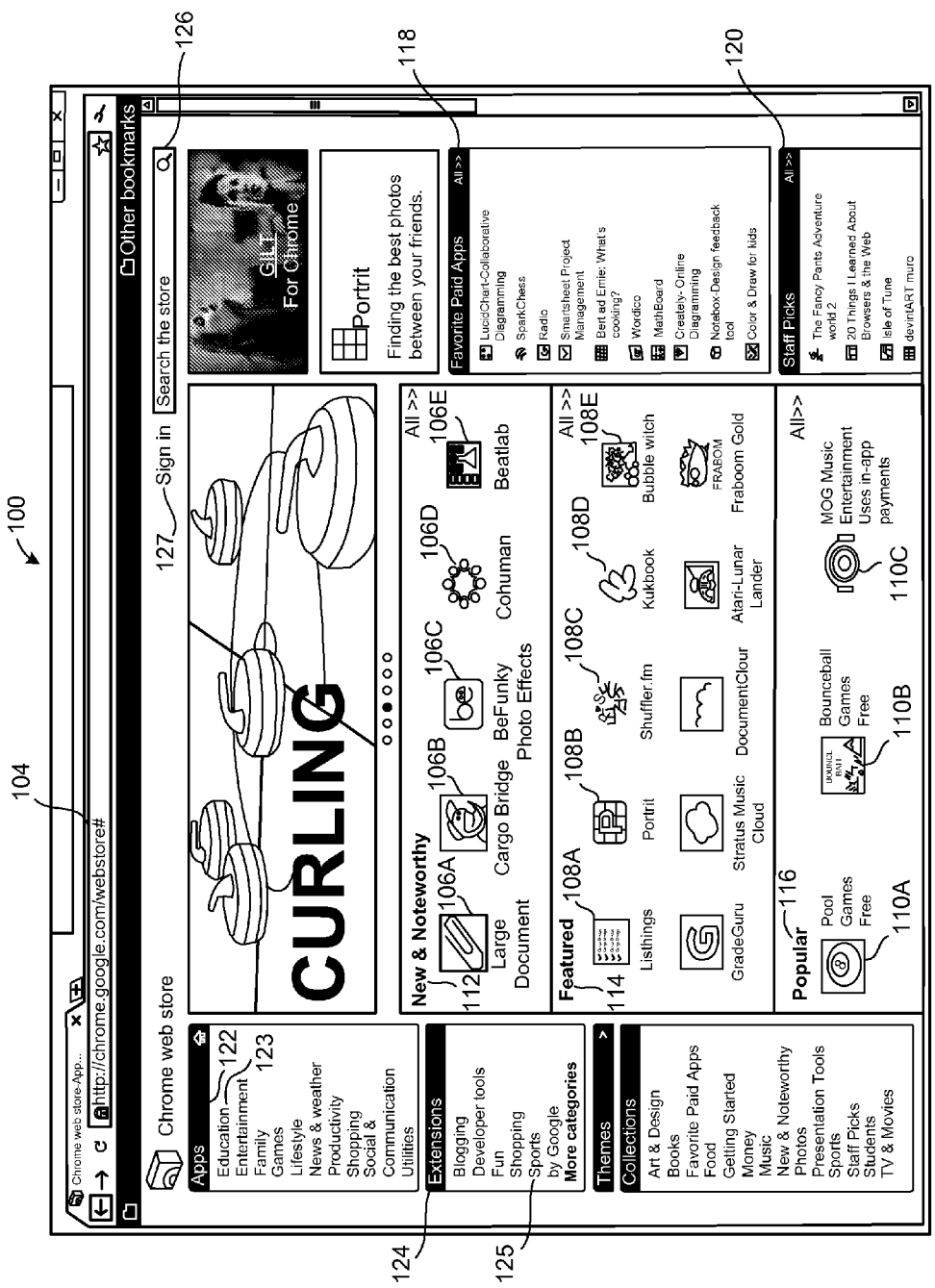
FIG. 1 is a screenshot of the user interface to a marketplace of digital goods.

FIG. 1 is a screenshot of a user interface 100 to a marketplace of digital goods. The user interface 100 can be displayed by a browser application that is executed by a computing device that may be connected to a network (e.g., the Internet). The browser application can open one or more tabs 102, one of which may display the user interface to the marketplace when a user navigates to a webpage identified by a uniform resource locator (URL) that provides content to the browser so that the browser can display the user interface to the marketplace in the tab.

The content provided by the webpage to the user can include a plurality of icons 106A, 106B, 106C, 106D, 106E, 106F, 108A, 108B, 108C, 108D, 108E, 110A, 110B, 110C that represent digital goods that can be downloaded from the webpage by the user for execution by a computing device controlled by the user. In one implementation, the digital goods can include applications that can be downloaded from the marketplace to a client computing device where they can be installed on the computing device for execution by a browser running on the computing device. Such applications can be known as "installable web applications," because they are downloadable from the World Wide Web and may be able to access the World Wide Web when executing in the browser. Thus, the installable web applications may not run natively on the computing device after they have been downloaded, but rather they may be executed through a browser that runs on the computing device.

Within the user interface 100, the installable web applications can be displayed in a manner that is organized to help a user decide which applications may be useful or relevant to the user. For example, the user interface 100 can include a category 112 of applications 106A, 106B, 106C, 106D, 106E, 106F that have been recently released in the marketplace and which a curator of the marketplace may deem to be especially noteworthy to users. In one implementation, the applications 106A, 106B, 106C, 106D, 106E, 106F shown in the category 112 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications 106A, 106B, 106C, 106D, 106E, 106F can be displayed within the category 112. That is, the applications 106A, 106B, 106C, 106D, 106E, 106F shown in the New and Noteworthy category 112 of the user interface 100 can be a subset of a larger number of applications that also could qualify as being new and noteworthy but which have not been selected for display in the user interface 100. A variety of signals that can be used to rank and select the subset of applications as described in more detail below.

In another example, the user interface 100 can include a category 114 of applications 108A, 108B, 108C, 108D, 108E that have been selected to be featured for display in the user interface 100. The applications 108A, 108B, 108C, 108D, 108E that are selected to be featured in the category 114 can be selected based on criteria evaluated by a curator of the market place. For example, the curator may select the applications 108A, 108B, 108C, 108D, 108E for display in the category 114 from a much larger set of applications based on the curator's opinion of the quality, popularity, or utility of the selected applications.

In another example, the user interface 100 can include a category 116 of applications 110A, 110B, 110C that have been selected for display in the category 116 of the user interface 100 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications 110A, 110B, 110C with the highest rankings can be selected for display in the user interface 100 of the marketplace.

The user interface 100 of the marketplace also can include categories of applications in other subportions of the user interface 100 in which smaller icons are used to represent the applications that are used in categories 112, 114, 116. For example, category 118 can display "Favorite Paid Apps," which can be applications for which a user must pay money before being able to download and install the application on the user's computing device. Applications listed in the Favorite Paid Apps category 118 can be the most frequently downloaded and/or most frequently installed applications for which the user must pay money. In another example, category 120 can display "Staff Picks," which can be applications that are selected by a curator at the marketplace based on the selected applications being deemed especially interesting to users who visit the marketplace in search of applications.

Within the user interface 100, categories 112, 114, 116, 118, 120 can display a subset of applications that are categorized to fall within the category. Because screen space within the user interface is limited, only a subset of the applications that fall within a category may be displayed within the user interface 100. However, by selecting a hyperlink associated with the category, more applications that fall within the category can be displayed to a user. For example, each category 112, 114, 116, 118, 120 is associated with a hyperlink labeled "All," the selection of which may cause more applications that fall within the category to be displayed.

Other parts of the user interface 100 also can be used to organize the digital goods that are available in the marketplace. For example, an "Apps" section 122 can provide a list of hyperlinks, which each can be selected to display applications that belong to a category identified by the hyperlink. For example, selection of the "Education" hyperlink 123 can cause a group of icons that represent applications related to educational topics to be displayed. In another example, an "Extensions" section 124 can provide a list of hyperlinks, which each can be selected to display extensions that belong to a category identified by the hyperlink, where an extension is executable code that extends the functionality of a browser. For example, selection of the "Sports" hyperlink 125 can cause a group of icons that represent extensions related to sports topics to be displayed.

In addition to locating digital goods (e.g., Web applications and extensions) that are already displayed within a category 112, 114, 116, 118, 120 of the user interface 100 what it could be displayed as a result of selecting a hyperlink 113, 123, 125, digital goods also can be located as a result of a query for goods that may be of interest to the user. For example, a user may enter query terms into a query box 126 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 100.

The user interface 100 also includes a hyperlink 127 that can be selected so that the user can log into the marketplace. For example, selection of the hyperlink 127 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 100, where the selection of the goods can be personalized to the user based on data associated with the user's account.

Figure 2:
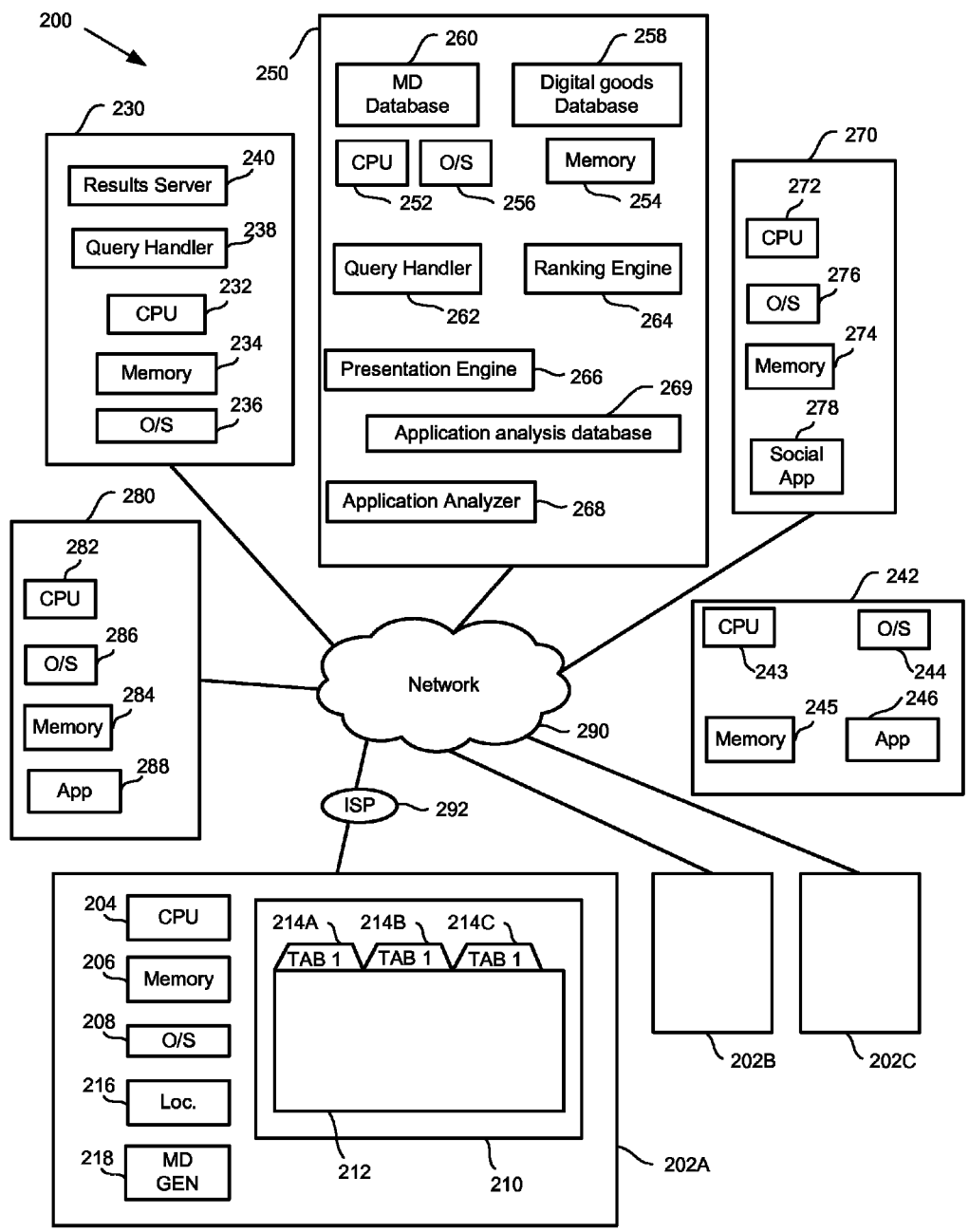
FIG. 2 is a schematic diagram of a system for ranking digital goods in a marketplace.

FIG. 2 is a schematic block diagram of an example embodiment of a system 200 for ranking digital goods in a marketplace. In various embodiments, the system 200 may include client computing devices (e.g., desktop computers, notebook computers, netbook computers, tablet computers, smartphone, etc.) 202A, 202B, 202C. A client computing device 202A can include one or more processors 204 and one or more memories 206. The client computing device 202A can execute an operating system 208 and an application 210 that which may display a user interface window 212. The client computing device 202A can include a location detector 218, which may automatically detect a location of the computing device, for example, based on global positioning system (GPS) signals, or by triangulation of signals from transmitters at known locations, or by using other hardware and/or techniques. The client computing device 202A can include an installer engine 220 that can receive code for an application that is to be run on the client device 202A from a server and can install the code on the client device so that the application can be executed by the device.

In one embodiment, the client computing device 202A may be running or causing the operating system 208 to execute an application 210 or window 212. For purposes of illustration the window 212 is referred to as a web browser. However, it is understood that the above is merely one illustrative example to which the disclosed subject matter is not limited. In various embodiments, this window 212 may include a plurality of panes or tabs 214A, 214B, 214C. The window 212 can be a visual area, usually rectangular, containing some kind of user interface. In a graphical user interface (GUI) used in the client device 202A, the window 212 can be a two-dimensional object arranged on a plane of the GUI known as the desktop. The window 212 can include other graphical objects, e.g., a menu-bar, toolbars, controls, icons and usually a working area in which the document, image, folder contents or other main object can be displayed. The working area may be capable of holding only one main object (i.e., in a single document interface) or more than one main object in a multiple document interface. In some applications, specifically web browsers, multiple documents can be displayed in individuals tabs 214A, 214B, 214C. These tabs 214A, 214B, 214C are typically displayed one at a time, and are selectable via a tab-bar which often resides above the contents of an individual window. That is, one selected tab 214A is "forward-facing" and displays information or content to a user in the window 212, with the content of other tabs 214B, 214C is "hidden."

The client computing devices 202A, 202B, 202C may receive online content from one or more server computing devices 230, 242, 250, 270, 280 that may be connected to the client device 202 through a network 290. Each of the client computing devices 202A, 202B, 202C can be connected to the network 290 through a local Internet Service Provider 292. The received online content can be processed and displayed in the window 212 (e.g., in a on a tab 214 of the window 212). For example, the window 212 can display a user interface of a marketplace for digital goods, similar to the user interface of the marketplace described herein, to a user. A user can interact with the displayed content, and an activity metadata generator 218 can monitor the user's interactions with the content and the performance of the application 210 and can generate activity metadata based on the user's interactions with the content and based on the performance of the application 210.

A location of the client computing device 202A can be determined based on a location associated with the ISP 292. For example, a known location of the ISP can be used as an approximation or as a proxy for the location of the client computing device 202A.

The client computing device 202A can communicate with a digital goods marketplace server 250 that provides a marketplace for digital goods to client computing devices 202A, 202B, 202C. The marketplace server 250 can include one or more processors 252 and one or more memories 254. The marketplace server 250 can execute an operating system 256 and various applications and services to provide functionality to the client computing devices. For example, in one implementation, the marketplace server 250 can include a repository for database of digital goods 258, and the digital goods can be served from, or downloaded from, the repository to the client computing devices. In another implementation, the digital goods can be stored in, and serve to client computing devices from, a repository that is remotely located from the marketplace server. For example, digital goods could be stored and served to client computing devices from individual repositories that are operated and controlled by developers of the digital goods, and digital goods repository 258 of the marketplace server 250 can provide just a reference to the individual repositories that are operated by the developers.

When the digital good, for example, a packaged web application that can be run offline (i.e., locally, with the client device 202A, without access to the network 290), is downloaded from the marketplace server 252 the client device 202A, the installer engine 220 can receive the downloaded digital good and install it for execution on the client device. For example, the installer engine can use browser extensions application programming interfaces (APIs) to integrate the web app with the browser, so that the web app can launched seamlessly within the browser application 210. Hosted web applications that can be run online, e.g., that are hosted by an online server that executes the application and serves content to the client device 202A through the network 290 for presentation to the user, also can be installed with the browser, by granting the hosted web app increased permissions to local resources on the client device. For example, installing the hosted app may include granting the hosted app permission to use unlimited local storage on the client device 202A or to access a user's browsing history, bookmarks, etc. that is stored on the client device 202A. Such permissions can be stored as part of the installation process for the hosted web app, so that the user need not re-grant these permissions each time the hosted web app is used.

The system 200 can include a developer client 242 with which a developer can develop applications or extensions or other digital goods to be uploaded to the marketplace server 250 for presentation in the marketplace server. The developer client 242 can include one or more processors 243, one a more memories 245 for storing data such as, for example, executable instructions and/or content, an operating system 244, and one or more applications 246 they can be executed by a developer to perform various tasks such as, for example, developing digital goods for presentation in the marketplace, receiving payments from the marketplace server 250, etc.

The marketplace server 250 can include a metadata database 260 that stores metadata associated with the digital goods that are available from or referenced by the digital goods repository 258. The metadata associated with a digital good can include a variety of information about the digital goods including, for example, information about the digital goods that are available from the repository 258. Such information can include, for example, representative keywords associated with the digital goods, the price associated with the digital goods. The metadata may also include demographic data about targeted users of the digital good, a time of year month or day during which the digital goods may be of the highest interest to a user, etc. For example, metadata associated with the surfing videogame may indicate that the good is intended for use by male users between the ages of 15 and 34, who live in coastal California or Hawaii, and that the game may be more popular during summer months than during winter months.

The marketplace server 250 can include query handler 262 that can be configured to receive and process queries for digital goods available in the marketplace. For example, the query handler can receive queries for digital goods that are entered into query box 126 of the user interface 100 shown in FIG. 1. Terms or phrases of the queries then can be compared to terms and phrases (e.g., terms and phrases stored in the metadata database 260) that are used to index the digital goods available in the marketplace. Based on the comparison, a subset of digital goods can be selected from the database 258 with which to respond to the query.

The marketplace server 250 can include a ranking engine 264 that is configured to rank digital goods based on signals relevant to the relative desirability of the goods to a user, where at least one of the signals is based on information that is generated outside the marketplace. For example, the goods can be ranked based on their price in the marketplace, but such a signal such as price is generated within the marketplace because the prices relevant only within the marketplace. However, as described herein, other signals can be generated outside the marketplace and used by the ranking engine to rank the relative desirability of goods to a user.

The marketplace 250 can include a presentation engine 266 that prepares information for transmission to the client computing devices 202A, 202B, 202C, where the information is used by the client computing devices to display a user interface 100 that shows representations of selected digital goods available in the marketplace. For example, based on the output of the ranking engine 264, the presentation engine 266 can prepare HTML code, XML code, etc. that determines the information that is displayed to a user in the user interface 100 and where the code determines which digital goods will be displayed in the user interface 100 to the user.

The ranking engine 264 can use a variety of signals to rank the relative desirability to the user of different digital applications available in the marketplace, where some of the signals can be based on information that is generated outside of the marketplace. In one implementation, the signals used by the ranking engine 264 can be based on how a web application available from the marketplace is used by a client computing device or how a web application performs when utilized by a client computing device.

As explained in more detail below, the marketplace server 250 can include an application analyzer 268 that can analyze digital goods (e.g., web applications) that a developer may propose for listing in the marketplace to analyze the proposed application and to ensure that the proposed application conforms to certain quality standards and does not contain malicious code. The application analyzer 268 can perform such analysis with the assistance of an application analysis database 269 that contains information that may be used in the analysis.

In one implementation, a signal used by the ranking engine can be based on how often a digital good available from the marketplace is used on a client computing device 202A, 202B, 202C, after the digital good is downloaded from the digital goods repository 258 to the client computing device for execution on the client. For example, when a web application is downloaded from the repository 258 and is executed by a browser application 210 running on the client device 202A, the browser application can monitor each time the web application is launched within the browser and can report this information to the ranking engine 264. The ranking engine 264 then can rank the applications based on how often they are launched by client devices after they are downloaded. For example, an application that is launched frequently can be ranked higher than an application is launched less frequently.

The browser application 210 also can monitor and gather information about how often a user interacts with a web application after the web application has been downloaded from the digital goods database 258 and launched within a browser application 210 of the client computing device 202A. For example, the browser application 210 can provide a window 212 that can include multiple tabs 214A, 214B, 214C where one tab can be front-facing while other tabs are hidden. The browser application 210 can monitor how often a web application that is launched in the browser is front-facing, as opposed to hidden, and this information can be provided to the ranking engine 264 to provide an indication of how often a user interacts with the web application. The ranking engine 264 then can rank with applications based on how frequently a user interacts with the applications after they are downloaded. For example, an application with which a user interacts frequently can be ranked higher than an application with which a user interacts less frequently.

In another implementation, a signal used by the ranking engine can be based on a rate at which a web application available from the marketplace crashes while being executed by a client computing device 202A, 202B, 202C. In one implementation, after downloading a digital good from the marketplace server 252 to the client computing device 202A, the digital good can be executed by an application 210, and the application can provide feedback to the marketplace server 250 about the performance of the digital good. For example, a web application can be downloaded from the digital goods database 258 and installed on the client computing device 202A for execution by a browser application 210. Then, the browser application can monitor the performance of the web application, and the frequency with which the web application crashes.

The information that is provided by an application 210 running on a client device to the marketplace server 250 (e.g., regarding how a web application is launched, how often the user interacts with a web application, how often a web application crashes, etc.) can be provided on an opt-in basis. In other words, such information may be provided from the client computing device 202A to the server 250 only if the user of the client device specifically authorizes the transmission of such information from the client to the server.

Because the browser application 210 can communicate easily over the network 290, the browser application can provide feedback to the ranking engine 264 of the marketplace server about the local usage of the web application on the client computing device. By receiving such feedback from many client computing devices 202A, 202B, 202C, the ranking engine 264 can gather a great deal of information about how an application is actually used after it is downloaded from the marketplace server 250. Thus, the ranking engine 264 has the ability to rank digital goods available from the marketplace server 250 based on signals relevant to the relative desirability of different applications to users, where such signals can include signals based on information about how applications are actually used, or how applications actually perform, after the applications are downloaded from the marketplace server 250 and installed on a client computing device. Moreover, by using signals that are automatically generated as the web applications are used, the ranking of the digital goods in the marketplace can be somewhat more objective than rankings based on subjective user reviews based on users' experience with the web application, which users may enter directly into the marketplace server 250 (e.g., by adding metadata information about a digital goods to the metadata database 260).

The above-described signals are but a few examples of signals based on information that is generated outside of the marketplace and that is relevant to the relative desirability to the user of different applications that are available from the marketplace. Other signals also can be used by the ranking engine 264.

In another implementation, signals based on information that is generated outside of the marketplace and that are used by the ranking engine 264 for ranking the relative desirability of digital goods available marketplace can include signals based on information provided by a search engine. For example, in one implementation, such signals can be based on recent trends in query terms received through a search engine.

As shown in FIG. 2, the system 200 can include a search engine server 230 that includes one or more processors 232, one or more memories 234, an operating system 236, a query handler 238, and a result server 240. The query handler 238 can receive queries that include one or more query terms or query phrases from client computing devices 202A, 202B, 202C, and a result server 240 can provide search results in response to the queries. The search engine server 230 can monitor the query terms and phrases received from client devices, and based on the query term traffic the search engine server 230 can generate statistics about trends in users' interests. For example, when a previously-unknown singer becomes a star entertainer, trends in query term traffic may reveal that users are becoming more interested in discovering information about the singer. Similarly, when a movie or a game becomes popular, trends in the search engine traffic received to the search engine server 230 can automatically reveal the increase in the popularity. In another example, search engine trends can be driven by seasonal factors, such as search queries for "costumes" rising in the weeks before Halloween, or queries for the purchase of products rising during the winter holiday season.

Such trends in query term traffic can be provided by the search engine server to the marketplace server 250, so that the ranking engine 264 of the marketplace server can rank digital goods available in the marketplace based on trends in query traffic. For example, the ranking engine 264 can boost or lower the relative ranking of individual digital goods available in the marketplace will 250 based on search engine traffic. Thus, for example, when search engine traffic reveals that a game or a movie is becoming popular, and such information is provided to the ranking engine 264, the ranking engine can boost the ranking of web applications that are related to the game or the movie.

In another implementation, signals based on information that is generated outside of the marketplace and that are used by the ranking engine 264 for ranking the relative desirability of digital goods available marketplace can include signals based on information provided by a social network applications or servers. For example, in one implementation, such signals can be based on how digital goods are used by acquaintances of a particular user, and the rankings performed by the ranking engine 264 can be based on such signals and can be specifically tailored for the particular user.

As shown in FIG. 2, the system 200 can include a social network server 270 that includes one or more processors to 272, one or more memories 274, an operating system 276, and a social network application 278. The social network application 272 can provide a network, environment, virtual world through which a particular user can interact with selected colleagues, friends, acquaintances (collectively, "friends") of the particular user. For example, the particular user can exchange information with his or her friends about interests that they may share. Thus, a user that downloads a digital good from the marketplace server 250 and installs and executes the digital goods within a client computing device controlled by the user may recommend the web application to the user's friends. Such recommendations pass through the social application 278, and anonymous information about such recommendations can be gathered by the social network server 270 and then passed on to the ranking engine 264. The ranking engine then can base its rankings of digital goods in the marketplace on statistical information about such recommendations. For example, the ranking engine 264 can boost the ranking of a web application that has received a large number of recommendations within the context of a social network application 278. In another example, the ranking engine 264 can boost a user-specific ranking of a web application when the web application has been recommended frequently within the context of a social network application by friends of the specific user to their friends.

The ranking engine 264 also can use other signals that are generated outside of the marketplace to generate rankings of digital goods available in the marketplace. In one implementation, the ranking engine 264 can provide rankings specific to a user of digital goods that are available within the marketplace, where the rankings are based in some way on information that is associated with the user and that is generated outside the marketplace. For example, a location associated with the user can be compared to metadata associated with digital goods, and the ranking engine 264 can provide rankings of digital goods based on such comparisons. A location of a user can be determined in a number of ways, including by the location generator 216 or based on a location associated with the ISP 292 through which the user's client device communicates with a network 290. The location of a user can be compared to metadata associated with digital goods so that the relevance of digital goods to the user can be ranked based on the user's location. For example, an application that calculates marine tides generally be of low relevance to a particular user who lives far from the coast, and accordingly should be ranked low for the titular user by the ranking engine. Thus, when information about the user reveals that the user lives or is located in Albuquerque N. Mex., then a marine tide web application that is associated with metadata indicating that the application is relevant to coastal users, would have a relatively low ranking for the user.

In another implementation, information associated with the user can include a browsing history of the user that provides information about content (e.g., websites) that the user has accessed through a browser application 210. Metadata about the accessed content, or the content itself, can be compared to metadata associated with digital goods available in the marketplace. Based on the comparison, the ranking engine 264 can provide rankings of the available digital goods to a user that are individually-tailored to the interests of the user, as determined from the browsing history of the user. For example, if the browsing history reveals that the particular user is primarily interested in playing computer or video games, then the ranking engine can boost the user-specific rankings of game applications that are available in the marketplace.

The information that is provided by an application 210 running on a client device to the marketplace server 250 (e.g., regarding a user's browsing history, etc.) can be provided on an opt-in basis. In other words, such information may be provided from the client computing device 202A to the server 250 only if the user of the client device specifically authorizes the transmission of such information from the client to the server.

Figure 3:
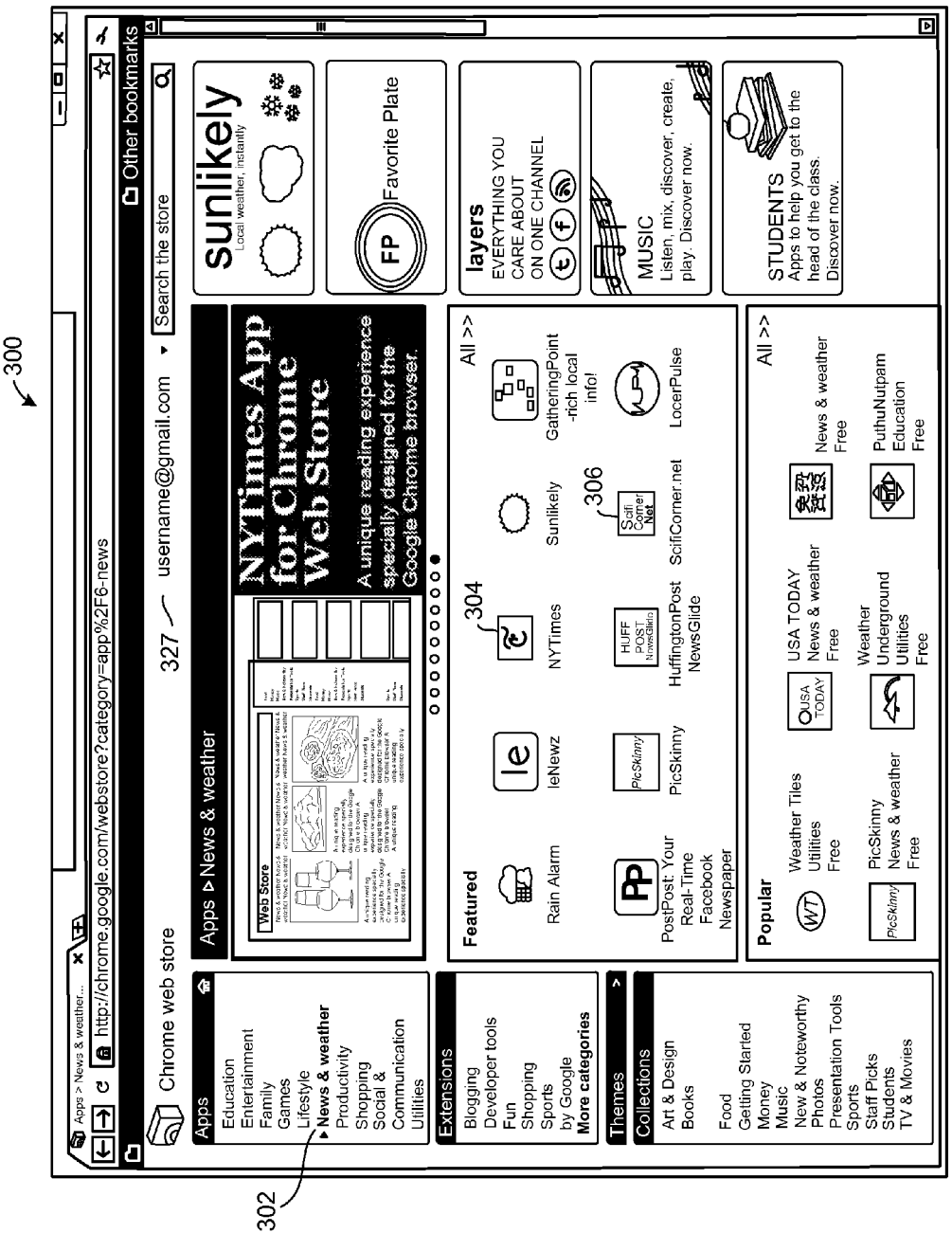
FIG. 3 is another screenshot of a user interface to a marketplace of digital goods.

FIG. 3 is another screenshot of the user interface 300 to a marketplace of digital goods. The presence of a username 327 in place of the hyperlink 127 that is selectable so that the user can enter login credentials indicate that a user has logged in to an account associated with the marketplace that is presented by the marketplace server 250. The account associated with the marketplace also can be associated with other online or local services or applications the user may use, which may be provided by a server 280 that includes one or more processors 282, one or more memories for storing data 284, one or more operating systems 286, and that can execute one or more applications or services 288. For example, the account associated with the marketplace also can be associated with the user's online e-mail account (e.g., Microsoft Hotmail, Yahoo mail, Google Gmail, etc.) the user's online social network account (e.g. Facebook, twitter, etc.), the user's online photo account (e.g., Snapfish, Shutterfly, Picasa, etc.), accounts at content websites (e.g., news websites game websites, entertainment websites, etc.), etc. By associating the user's marketplace account with other accounts of the user, information from the other accounts can be utilized, with the permission of the user, by the ranking engine 264 to provide user-specific rankings of digital goods available in the marketplace to the user. For example, selection of the "news and weather" hyperlink 302 can trigger the display of featured in popular web applications related to news and weather within the user interface 300.

The applications that have been selected for display in the user interface 300, and the position and order in which the selected applications are presented in the user interface, can be based on rankings of the applications provided by the ranking engine 264. For example, if the user has registered and opened an account with the website of the New York Times and that account is associated with the user's marketplace account 327, then the ranking engine 264 may boost the ranking of a web application 304 that is associated with the New York Times. If that user has not registered and opened an account with the Wall Street Journal, or if a user account with the Wall Street Journal is not associated with the user's marketplace account, then the ranking engine may boost the ranking of a web application associated with the New York Times 304 above the ranking of a web application associated with the Wall Street Journal for that particular user. Then, the web application associated with the New York Times 304 may be selected for display in the user interface 300 over a web application associated with the Wall Street Journal.

In another implementation, the ranking engine 264 may select an application 306 that provides news about science fiction related topics for display in the user interface 300 based on signals that are generated outside of the marketplace. For example, if the user's social network friends have downloaded and installed a web application related to science fiction news 306, the ranking engine 264 may boost the ranking of the web application 306. In another example, if the user's browsing history indicates that the user is interested in science fiction related information, the ranking engine 264 may boost the ranking of the web application 306.

Figure 4:
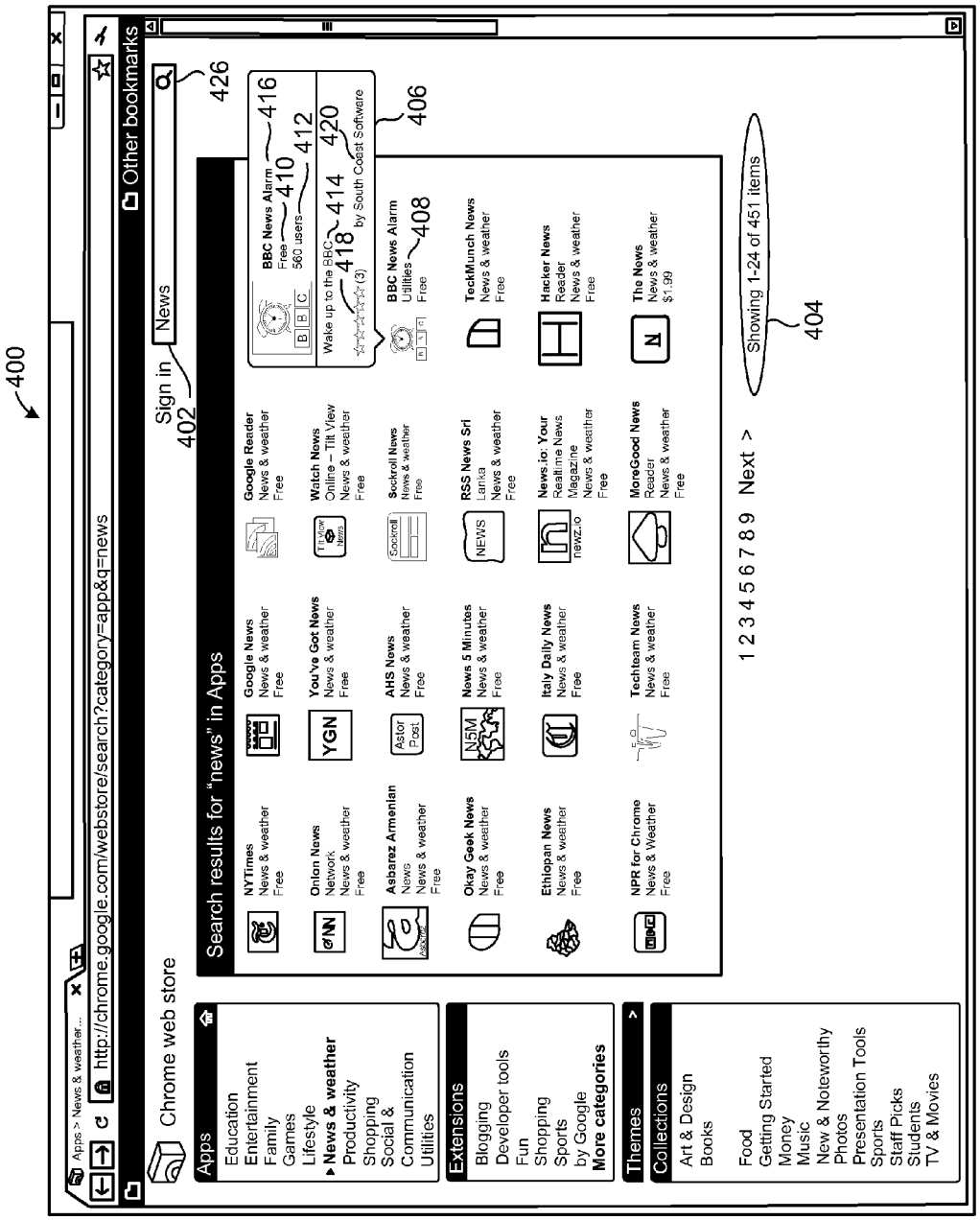
FIG. 4 is another screenshot of a user interface to a marketplace of digital goods.

FIG. 4 is a screenshot of the user interface 400 to a marketplace of digital goods. The screenshot is representative of a user interface that can be displayed when a user enters a query term "news" in query box 426 to search for web applications available in the marketplace that are related to news. The query term can be compared to metadata associated with digital goods, for example, metadata stored in metadata database 260. Based on the comparison, the query handler 262 can identify one or more digital goods that are related to the query term. The user interface 400 includes a display item 404 that indicates that a total of 451 web applications have been identified in the marketplace as relevant to the query term "news" and that 24 of the identified applications have been selected for display in the interface 400. The applications that are selected for display in the user interface can be selected based on a ranking of the relative desirability of the identified applications. Furthermore, among the selected subset of applications, the position of the applications within the user interface 400 can be determined by their ranking. For example, applications with higher rankings can be displayed in rows at the top of the user interface 400, and, within a row, applications with a higher ranking can be displayed on the left side of the row.

A pop-up HTML window 406 can be displayed when a user moves a mouse icon over an icon for an application 408 that is displayed in the user interface 400. Within the pop-up HTML window 406, additional information about the web application 408 can be displayed. For example a field 410 can indicate whether the application is free or the price that must be paid to be able to download and install the app. Another field 412 can indicate how many users have downloaded and/or installed and/or used the application. Information about the installation and/or use of the application on a client device can be transmitted from a browser executing the application of the client device to the marketplace server 250. Another field 414 can display descriptive information about the web application that supplements information in the title field 416. Another field 418 can display an average subjective rating that users have provided of the web application and a number of users that have rated the application. Another field 420 can display the name of the author or developer of the application.

The rankings can be determined based on a number of factors or signals, which may include signals that are generated within the marketplace and outside of the marketplace. For example, signals generated within the marketplace can include a relevance of a web application to the query term(s) 402 that are entered in the query box 426 (e.g., as determined by the query handler 262), user feedback of the web applications entered into the marketplace (e.g., by the user's providing comments on the web application or by ranking the application based on a 1-5 star system), or by the number of times an application has been downloaded from the marketplace.

For example, signals generated outside of the marketplace can include the number of times a web application has been launched by an application (e.g., a browser application) running on a client to which the application has been downloaded, the number of times a web application is crashed after it has been downloaded to a client device, how often an application is used after it is downloaded to a client device, how often an application is front facing after being launched by an application running on a client device to which the application has been downloaded, etc. In the example shown in FIG. 4, the NYTimes web application may be the highest ranked application of the 451 items that are responsive to the "news" query entered in the query box 426 and therefore can be displayed in the user interface in the top left corner of the interface. Other applications that are less highly ranked in the NYTimes application may be displayed elsewhere in the user interface or may not be displayed in the first group of 24 applications that are displayed in the interface shown in FIG. 4.

Figure 5:
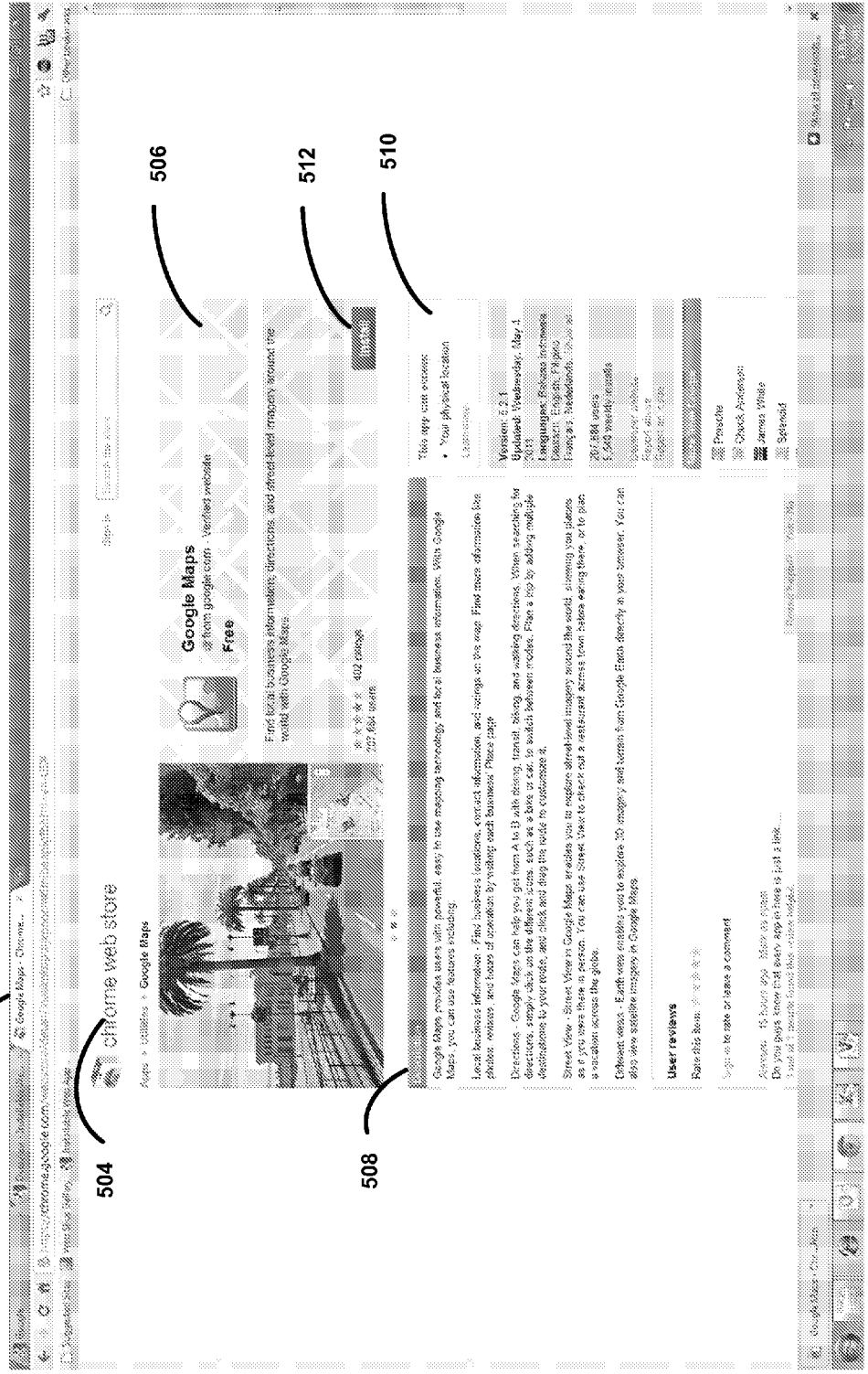
FIG. 5 is an exemplary screenshot that illustrates an exemplary browser application.

FIG. 5 is an exemplary screenshot 500 that illustrates an exemplary browser application 502. For example, in one implementation, the browser application 502 may be the Google Chrome browser application. In this example, a user has navigated the browser application 502 to a marketplace, where the marketplace is a location on the Internet accessible by the browser application from which a user can download applications, such as, web applications and extension applications that are integrated and downloadable as part of the browser application.

For instance, the Google Chrome web store is a location on the Internet from users can download such applications and extensions. These installable web applications may be a normal website with some extra metadata. The installable web application and installable web extension applications may be built as a normal web application that uses standard web technologies for both server-side and client-side code. In addition to the normal web application, the installable web applications and extensions may include extra metadata that is associated with the application, which affects the web application's interaction with the browser application.

As used herein, the terms web application and web app may be used interchangeably to refer to an application including metadata that is installed in a browser application. The terms extension application, web extension, web extension application, extension app and extension may be used interchangeably to refer to a bundle of files that are installed in the browser application to add functionality to the browser application. The term application, when used by itself without modifiers, may be used to refer to a web application and/or an extension that is installed or that is to be installed in the browser application.

In FIG. 5, the user has navigated the browser application 502 to the Chrome web store 504 and more specifically to page of the web store displaying information about the Google Maps installable web application 506. In this exemplary screenshot, the browser application describes the installable web application in a description field 508. The description field 508 provides information to the user regarding the functionality and capabilities of the particular web application. In one implementation, navigating the browser application to a specific web application within the marketplace may be considered a request to install the application in the browser on a device in which the browser application is running. For instance, the navigation by the user to the particular webpage illustrated in FIG. 5 may indicate a request to install the Google maps application in the browser application on the device on which this browser is running. However, the application will not actually be installed until a confirmation is received from the user.

FIG. 5 also illustrates a notification field 510 that includes at least one permission that is associated with this web application. The notification 510 identifies at least one permission, which indicates the declared permissions that may be used by the web application. In this example, the Google Maps application indicates the declared permission that this particular application can access is the physical location. The notification field 510 provides explicit notification to a user of the permissions that this application may use upon installation in the browser application. By providing the permissions notification at the time of installation of the application, the user may either implicitly or explicitly grant approval for these permissions by choosing to proceed with the installation of the application. For example, a selection of the install button 512 indicates a confirmation to install the application, where the confirmation includes granting the permission. Upon selection of the install button 512, the application is installed in the browser application to include enabling the granted permission for use by the application.

The permissions may be a declaration of the access that is desired by the web application or extension application to device-side information, client-related information and/or server-side information associated with the client or device. While the above example illustrates a single permission, multiple permissions may be declared and granted by the user as part of the installation process for the application. In this manner, developers of web applications and extension applications declare the desired permissions and associate the declared permissions as part of the application. This informs the user about the access that is potentially being requested to specific information during the lifetime of the application while in use in the browser application of a client device controlled by the user.

In one exemplary implementation, the browser application 502 is configured to enforce the permissions associated with the application. In this manner, the browser application provides a mechanism to restrict or limit the application to only those permissions declared by the developer and granted at the time of installation. In this manner, access to browser application functionality and to client device-side information and other information may be limited to the declared permissions, which have been explicitly approved by the user at the time of installation. In this manner, defects in the web application or extension application that may be exploited by an attacker may be limited because the permissions are limited. Thus, an exploitation of a bug in the application is limited to only the declared permissions which were granted upon installation of the application.

In one exemplary implementation, a single declared permission may represent an aggregate of more than one permission. For example, a declared permission of "your physical location" means that the web application may access the device-side information related to a user's physical location including geolocation information. This also may represent a particular risk level and may be bundled with other location-related information in this one single permission. In this manner, a single permission that represents multiple similar types of declared permissions are bundled into a single group such that the user doesn't need to answer complex security questions that interrupt their normal workflow. They simply make an upfront assessment of trust that can later be revoked at any time. For example, if the user no longer desires to grant the permissions to the application, the user may simply uninstall the application. Other options may include selectively revoking individual permissions including permissions that represent an aggregate permission. If the user revokes permissions without uninstalling the application, some or all functionality of the application may be degraded.

A typical webpage operating in a browser application may be required to ask for permission from the user before they can perform relatively innocuous tasks such as showing notifications, using the clipboard, or accessing permanent storage. Each time the webpage wants to perform one of these tasks, the application may interrupt and prompt the user to grant permission. This may be annoying for the user and degrade the user experience for random webpages that are stumbled across each time access to the desktop or desktop notifications is requested. As discussed above, the installed web application or extension application in the browser application may grant all of the permissions needed or desired and declared by the application at the time of installation. The granted permissions can be stored, either locally or remotely, in association with the application and with the user that installed the application. Then, because the permissions have been stored, the user need not re-grant the permissions each time the user wishes to launch and run the web app.

Many different types of permissions may be declared by a developer as part of the application that is to be installed and executed within a browser running on a client device. For example, permissions may include permission for the web app to access a user's bookmarks, permission for the web app to access a user's web browsing history, permission for the web app to access or determine a user's geolocation, permission for the web app to access the URL's of, or information in, open tabs of the browser, permission for the web app to use unlimited local storage resources on the client device, permission for the web app to copy and paste information from the client device, permission to access local files on the client device executing the web app, permission to determine time when the web app is idle, permission for the web app to run native code on the client device, permission for the web app to run native code on the client device, permission for the web app to access or store a user's password information, permission for the web app to access local hardware of the client device. The hardware access permissions may include access to information and/or devices themselves including periphery access, power status, battery status, and other similar hardware device and related information access.

Other examples of declared permissions include context menus permissions, cookies permissions, and management permissions. A match pattern specifies a host permission. A match pattern may be used if the extension application or web application wants to interact with the code running on pages. Many extension capabilities, such as cross-origin XML HttpRequest, programmatically inject content scripts, and the cookies API require host permissions.

In some implementations, applications or extensions that interface with browser-related application programming interfaces (APIs) may use permissions that are needed by a specific API. For example, an API may require the use of access to the history of the browser application. If the history permission is declared and associated with the application, then after installation the web application may access the browser history without needing to request permission again and without further prompting to the user.

The bookmarks permission may be used if the web application or extension application uses the browser application bookmarks and bookmarks module, where bookmarks related to the browser application may be located. The geolocation permission may be used if the application or extension expects to use a geolocation API without prompting the user for permission. For example, the geolocation permission may be related to the proposed hyper-text mark-up language (HTML) 5 geolocation API. The notifications permissions may be related to the proposed HTML5 notification API without needing to use or request other permissions such as may be required by HTML5. The tabs permission may be used by an application or extension if other tabs or windows related to the browser application need to be accessed.

The unlimited storage web storage permission may be used by the web application or extension to provide an unlimited quota for storing client-side data, such as databases and local storage files. In this manner, any needed or desired storage space may be utilized by the web application. Without this permission granted, the application or extension may be limited to a specific size of local storage such as, for example, five megabytes of local storage.

The cross-origin XML HttpRequest permission may be used to enable a web application or an extension application to request access to remote servers outside of its origin. For example, cross-origin permission values may be fully qualified host names such as, for example, "http://www.google.com/" or "http://www.gmail.com/". In another example, the cross-origin permission values may be match patterns such as, for example, "code.google.com/chrome/ . . . /xhr.html" or "http://*.google.com/" or "http://*/". A match pattern of "http://*/" allows HTTP access to all reachable domains. If an application desires both secure and non-secure HTTP access to a given host or set of hosts, then those permissions may be declared separately in the manifest file.

In one exemplary implementation, the screenshot 500 illustrated in FIG. 5 may be the only page presented to enable the user to confirm installation of the application and provide implicit allowance of the permissions listed in the notification field 510. In other exemplary implementations, selection of the install button 512 may prompt an additional confirmation and notification for the user to review and select.

Figure 6:
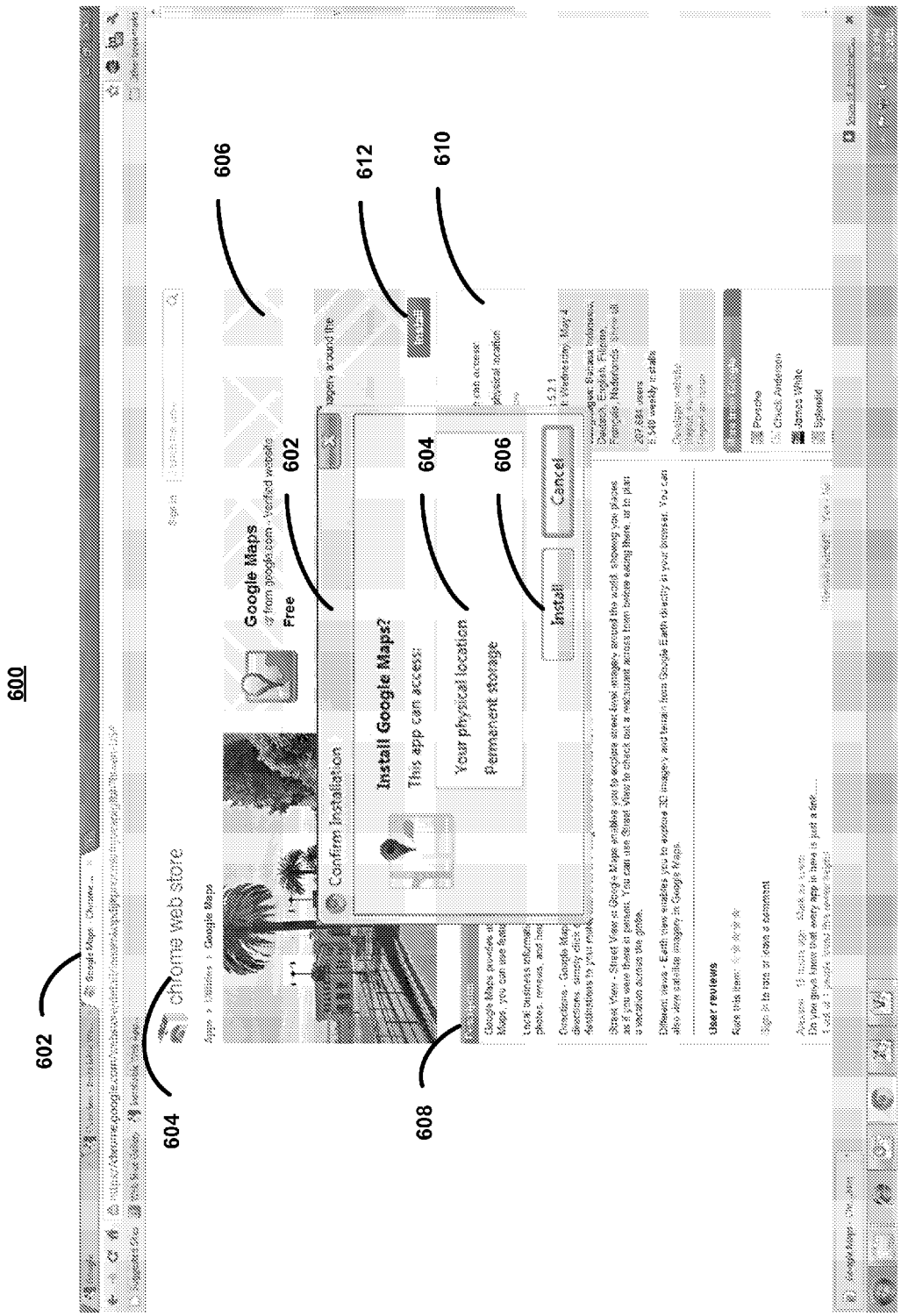
FIG. 6 is a screenshot that illustrates a confirmation or notification window that prompts the user to confirm installation of the desired web application.

FIG. 6 is a screenshot 600 that illustrates a confirmation or notification window 602 that prompts the user to confirm installation of the desired web application. In this example, the user is prompted for a final confirmation to install the Google Maps application in the browser application 502. The notification window 602 includes a permissions area 604, which lists the permissions requested and desired for use by the web application being installed. In this example, the Google Maps application list more than one permission in the permission field 604. For example, "your physical location" permission and "permanent storage" permission are listed in the permissions field 604.

In some instances, the access to information may be re-labeled differently than listed by the name associated with an API that needs specific access. For example, the API may designate access to a geolocation permission, but the notification window may rephrase geolocation information to make it more user-friendly and understandable and rephrase it as "your physical location" to make it clear to the user that the application will access the physical location of the browser application and the device on which it is operating, which may be assumed to be with the user. In this manner, full disclosure is made to the user at the time of installation. Should the user desire not to allow access to this information, the user may simply cancel the installation and access to the permissions will be denied to the web application.

Upon receiving confirmation to install the application, the application is installed in the browser application and the declared permissions are enabled. For example, when a user selects the install button 606, confirmation to install the application is received by the browser application 502, where the confirmation includes granting the permissions listed in the permissions window 604. The window 604 may be populated with information contained in metadata associated with the web application.

Figure 7:
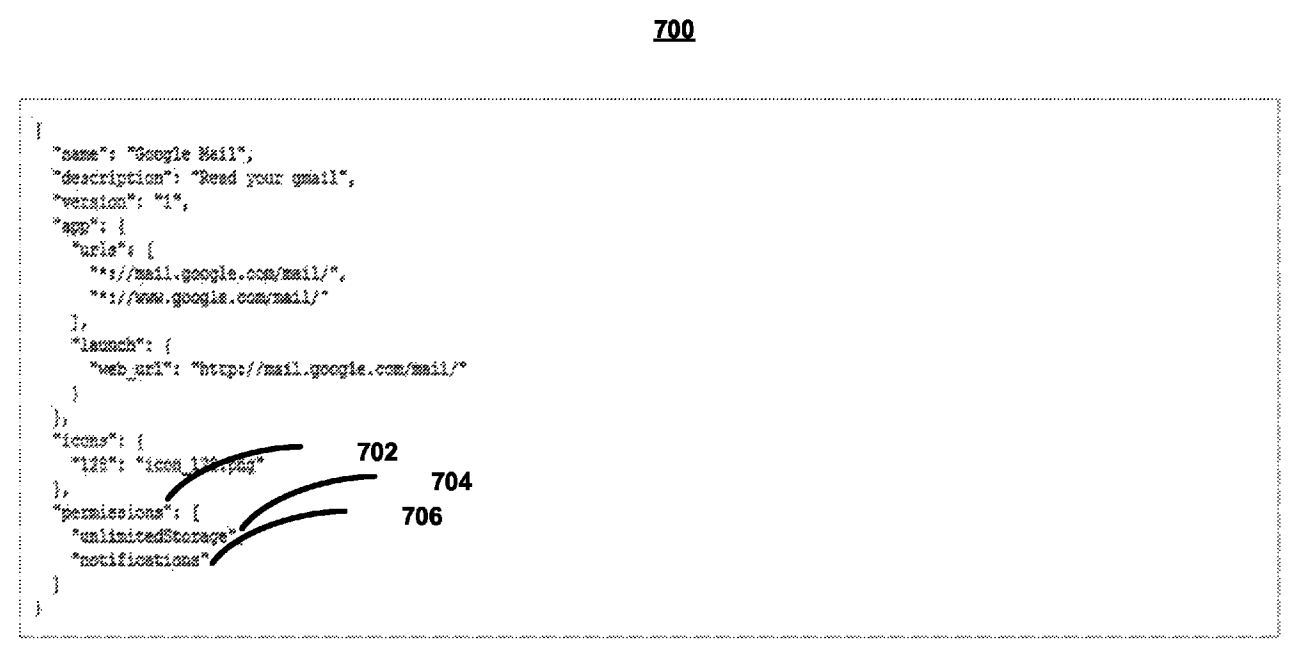

FIG. 7 is an exemplary file 700 containing a code snippet that may be referred to as a manifest or manifest file and that may contain metadata associated with the web application or extension application. The manifest may include one or more fields that specify information related to the application. One of the fields may include a permissions field 702. In the permissions field 702, a developer specifies the declared permissions that may be used by the application. In this example, the declared permissions include unlimited storage permissions and notifications permissions, 704 and 706, respectively. If no permissions are declared, the permissions field may be omitted from the manifest file. In other examples, multiple permissions may be declared in the permissions field 702. The manifest file 700 is associated with the application and is part of the instructions that are loaded in the marketplace. The notification window 604 and/or the notification window 510, which lists the declared permissions, may read the manifest file and the permissions field in order to populate these windows.

As discussed above, a single permission may represent one or more permissions. When a single permission represents multiple or aggregated permissions, these permissions may be related in some way. For example, the permissions may be related in such a manner that it would be redundant to list all of them for the user in the notification window at the time of installation of the application. In other examples, the permissions may be related by risk level and determine that if the user grants permission for a permission at one risk level, then it may be assumed that other risk levels at the same level would also be granted by the user.

In some instances, a developer of a web application may desire to add additional permissions in order to access other device-side information that was not originally declared at the time the application was installed. This may occur as part of an update to the web application or extension application and may be made available through the store in which the application was downloaded from through the browser application. The newly declared permissions are not granted merely upon the upload of a new web application to the marketplace. Instead, the new declared permissions associated with the upgraded web application may only be granted upon an upgrade to the existing web application installed on the browser application. As part of an installation for the web application upgrade, a new notification window may be presented to the user, where the notification window is populated from the manifest file associated with the upgraded web application and populated with the declared permissions from the permissions field. The user must confirm installation of the upgrade in order to install the upgraded web application and implicitly confirm and approve the new declared permissions.

In one implementation, the upgraded web application and the newly declared permissions may replace all of the previously existing declared permissions. In other instances, only the newly declared permissions may be presented and may simply add to the declared permissions already in existence and approved by the user upon the first installation. Prior to upgrading and changing the permissions to include newly declared permissions associated with an upgraded web application, the browser application may disable all previously approved and enabled permissions. In this manner, the user is protected and the browser application is protected and restricts access by the application until the upgraded web application is installed, where the installation includes notification and approval of the newly declared permissions.

In another exemplary implementation, another permission may be a background permission. The background permission may be used by a web application or extension application to open a background window in the browser application. The background window may not be visible to the user but may contain code needed to run in the background in order to have the installed web application or extension application function properly. The background permission may be specified in the associated metadata or manifest file in the same manner as other permissions. The background window may perform miscellaneous tasks in an invisible page that may operate and perform for the duration that the browser application is open and running or even after associated application and/or the browser application have been closed.

The browser application 502 may be configured to restrict one or more permissions associated with one or more installed web applications. For example, if a particular permission is deemed too risky or may provide access to mal-intent persons, it can be made more limited and all existing extension applications and web applications will be automatically limited when the browser is updated. For example, after release if it is decided that access to a particular file was not useful or was too dangerous, then the permission may be changed to require that end users explicitly opt-in to enable the web application or extension application to use that feature.

In one exemplary implementation, optional permissions may be used by developers and declared in the manifest. This allows developers to list a set of permissions that are not necessarily required for normal usage of the web application. When the developer decides that it would like to use one of these permissions, it can prompt for it on demand, which will then add it to the list of permissions that the extension or web application is granted. This may result in the following additional benefits over some of the required permissions. For example, if an extension wants to use a more dangerous feature that is likely only useful to a small group of power users, they can make the permission optional thus not forcing all users to grant it access to a potentially dangerous capability that they might not trust. Optional permissions also may be listed in the manifest and flagged as such. The optional permissions may not appear in the notification windows at the time of installation, since they are optional. The optional permissions may only request access on demand following installation of the application at the time when access is requested. The user is given the option to grant or deny the optional permission at the time that it is requested. If the user denies permission, then the permission may not access the desired device-related information. If permission is granted by the user, then the extension or application may access the desired information. If more than one version exists of the web application or extension application, a developer can make use of a feature in one version and not in other versions. Optional permissions may be used to include features in one version that are not included in other versions. By listing it as an optional permission, the permission might only be presented to users of the browser that have the feature, thus allowing the developer to experiment with the new feature while not causing problems or breaking existing users.

In another aspect, before listing applications in the marketplace so that consumers can download and install the application from the marketplace, the marketplace server 250 can analyze applications that developers or merchants propose for listing in the marketplace to ensure that the proposed applications meet certain quality standards and/or do not contain malicious or suspicious code.

A developer or merchant can upload a proposed web application that is proposed for listing in the marketplace from the client device 242 to the marketplace server 250 and can request that the marketplace operator list the application for sale or distribution from the marketplace. Within the marketplace server 250, the proposed application can be vetted by the application analyzer 268 before it is offered for sale or distribution to client devices 202A, 202B, 202C.

In one implementation, the application analyzer 268 can automatically parse the manifest file of the proposed application to determine the permissions that would be sought from a user who would download and install the proposed application. If the determined permissions are considered to pose a risk to a user of the application hundred to a client device running the application, then the proposed application can be flagged for manual review by a human curator of the marketplace. For example, if the application analyzer 268 determines that a proposed application seeks permission to run native code on a client device 202A, which may result in one or more security features of the browser application 210 being bypassed, then the proposed application can be flagged for additional review to ensure that the execution of native code by the proposed application would not result in harm to the user or to the client device. Only after the proposed application has been manually vetted and determined to not contain malicious code designed to cause malicious effects or suspicious code that leaves the client device vulnerable to security attacks may the proposed application be listed for distribution in the marketplace.

Additionally, when a potentially risky permission is automatically determined by the application analyzer 268, a legal agreement can be sent to a developer or merchant who seeks to list the proposed application in the marketplace, where the legal agreement requires that the signer of the agreement agrees to take on any and all liability associated with potential harmful or malicious effects of the application on the user or the client device. Then, the application may not be listed in the marketplace unless the legal agreement is properly executed and returned to the marketplace operator.

The determined permissions can be compared automatically to one or more predetermined permissions that are stored in an application analysis database 269, where the predetermined permissions are permissions that are deemed to be potentially risky. If a determined permission matches one or more of the predetermined permissions, then the proposed web application can be flagged for manual vetting before the proposed application can be listed for distribution in the marketplace. If none of the determined permissions patches a predetermined permission than the proposed web application can be automatically listed in the marketplace for distribution to consumers without any manual review of the application.

Because of the automated nature of the web application vetting process, which analyzes the permissions in the manifest file of the proposed applications, if the proposed application does not include information that has been predetermined to be risky, then the proposed application can be listed for distribution in the marketplace very quickly after the developer merchant requests that the application be listed. For example, the proposed application can be listed in the marketplace less than 10 minutes, less than 5 minutes, less than 3 minutes, or less than 1 minute after the request to list a web application has been received at the marketplace server 250. The speed with which an application can be listed for distribution to consumers after a developer merchant has requested that the application be listed can provide for a satisfying experience for merchants and developers.

In addition to checking the permissions of a proposed web application, the application analyzer 268 also can check if the code of the proposed web application matches one or more known malicious code sequences (i.e., malware) that may result in harm to the user to the client device 202A. For example, the application analysis database 269 can store a plurality of known fingerprints of malicious code sequences, and the application analyzer 268 can parse the code of the proposed web application and then compare the parsed code to the fingerprints of malicious code stored in the application analysis database. Then, if the code of the proposed application matches one or more known malicious code sequences the proposed application can be flagged for manual vetting before the proposed application is allowed to be listed for distribution in the marketplace. If the code of the proposed application does not match any of the known malicious code sequences, and if the permissions of the proposed application do not match any of the predetermined permissions, the proposed application can be automatically listed in the marketplace without further manual review of the application.

The application analyzer 268 also can check if the code of the proposed web application matches one or more suspicious code sequences that may leave the client device vulnerable to security attacks (e.g., cross-site scripting (XSS) attacks that enable attackers to inject client-side script into web pages executed by the client device 202A) or that indicate that the code of the web application has changed significantly and therefore may have changed its purpose. As with scanning for malware, the application analysis database 269 can store a plurality of known fingerprints of suspicious code sequences, and the application analyzer 268 can parse the code of the proposed web application and then compare the parsed code to the fingerprints of code stored in the application analysis database. Then, if the code of the proposed application matches one or more suspicious code sequences the proposed application can be flagged for manual vetting before the proposed application is allowed to be listed for distribution in the marketplace. The code of the proposed web application also can be compared to a previous version of the web application (e.g., if the developer or merchant is requesting to list and updated version of a previously-listed application) to determine if the proposed web application is significantly different from the previous version of the web application. If the code of the proposed application does not match any of the malicious code sequences, and has not changed significantly from a previously-listed version of the web application, and if the permissions of the proposed application do not match any of the predetermined permissions, the proposed application can be automatically listed in the marketplace without further manual review of the application.

The application analyzer 268 also can check if the proposed web application includes copyrighted or trademarked material. The application analyzer 268 can perform this service without waiving the community for liability for copyright infringement that an online service provider enjoys under the Digital Millennium Copyright Act (DMCA). For example, copyright holders and trademark holders (collectively "rights holders") can deliver copies of assets that they own into a database. The database could be the application analyzer database 269 or another database that is operably coupled to the marketplace server 250.

Then, when a proposed web application is uploaded to the marketplace server the proposed application can be compared to the copies of assets owned by rights holders. If a match between the proposed web application and an asset in the database is detected, then policies set by the rights holder can be applied by the application analyzer 268. In one implementation, when a match is detected the proposed web application can be blocked from listing in the marketplace. In another implementation, when a match is detected the proposed application can be flagged for manual review before it is allowed to be listed in the marketplace. In another implementation when a match is detected the proposed application can be allowed to be listed without any manual review triggered by the match, and the rights holder can be notified of the match.

FIG. 8 is a flowchart of a process 800 that implements techniques described herein. The process 800 includes providing an online marketplace to developers of web applications that may be downloaded from the marketplace to a client computing device for execution by a browser executing on the client device (802). A request is received from a party to the marketplace to list a proposed web application for sale in the marketplace (804). The permissions requested by the proposed web application are automatically determined (806). Whether the permissions match one or more predetermined permissions is automatically determined (808). If the requested permissions match one or more predetermined permissions, then the proposed application is flagged for a manual vetting process before listing the proposed application in the marketplace (810). If the requested permissions do not match one or more predetermined permissions then the proposed application is listed in the marketplace without manual review of the application (812).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. In some implementations, a computer-readable storage medium can store instructions that when executed can cause a processor (e.g., a processor of a mobile device, a processor of a host device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Process steps may be performed by one or more programmable processors executing a computer program to perform functions by operating on input data and generating output. Process steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer-implemented method comprising:
providing an online marketplace to developers of executable installable software applications that may be downloaded from the marketplace to a client computing device for execution by the client device;
receiving a request from a party to the marketplace to list a proposed application for sale in the marketplace;
automatically determining, by one or more processors of a computer system, the permissions requested by the proposed application;
automatically determining, by one or more processors of the computer system, if the permissions match one or more predetermined permissions, and
if a match is determined, flagging the proposed application for manual review by a human curator to determine whether the proposed application includes malicious code before listing the proposed application in the marketplace, and
if a match is not determined, listing the proposed application in the marketplace without manual review of the proposed application.

2. The method of claim 1, wherein the one or more predetermined permissions includes a permission to run native code as part of the execution of the application.

3. The method of claim 1, wherein the one or more predetermined permissions includes a local hardware access permission.

4. The method of claim 1, wherein the manual review by a human curator includes manually running the proposed application and checking for malicious effects of the proposed application on a client device running the proposed application.

5. The method of claim 1, further comprising:
automatically determining, by one or more processors of the computer system, if code of the proposed application matches one or more known malicious code sequences, and if so, flagging the proposed application for a manual review by a human curator before listing the proposed application in the marketplace, and
if the code of the proposed application does not match the one or more known malicious code sequences and if the permissions do not match the one or more predetermined permissions, listing the proposed application in the marketplace without manual review of the application.

6. The method of claim 1, further comprising:
automatically determining, by one or more processors of the computer system, if code of the proposed application matches one or more suspicious code sequences, and if so, flagging the proposed application for a manual review by a human curator before listing the proposed application in the marketplace, and
if the code of the proposed application does not match the one or more suspicious code sequences and if the permissions do not match the one or more predetermined permissions, listing the proposed application in the marketplace without manual review of the application.

7. A non-transitory computer-readable storage medium having recorded and stored thereon instructions that, when executed by one or more processors of a computer system cause the computer system to:
provide an online marketplace to developers of executable installable software applications that may be downloaded from the marketplace to a client computing device for execution by the client device;
receive a request from a party to the marketplace to list a proposed executable installable software application for sale in the marketplace;
automatically determine the permissions requested by the proposed application;
automatically determine if the permissions match one or more predetermined permissions, and
if match determined, flag the proposed application for manual review by a human curator to determine whether the proposed application includes malicious code before listing the proposed application in the marketplace, and
if match not determined, list the proposed application in the marketplace without manual review of the proposed application.

8. The computer-readable storage medium of claim 7, wherein the one or more predetermined permissions includes a permission to run native code as part of the execution of the application.

9. The computer-readable storage medium of claim 7, wherein the one or more predetermined permissions includes a local hardware access permission.

10. The computer-readable storage medium of claim 7, wherein the manual review by a human curator includes manually running the proposed application and checking for malicious effects of the proposed application on a client device running the proposed application.

11. The computer-readable storage medium of claim 7, wherein the instructions, when executed by the one or more processors of the computer system further cause the computer system to:
automatically determine, by one or more processors of the computer system, if code of the proposed application matches one or more known malicious code sequences, and if so, flag the proposed application for a manual review by a human curator before listing the proposed application in the marketplace, and
if the code of the proposed application does not match the one or more known malicious code sequences and if the permissions do not match the one or more predetermined permissions, then to list the proposed application in the marketplace without manual review of the application.

12. The computer-readable storage medium of claim 7, wherein the instructions, when executed by the one or more processors of the computer system further cause the computer system to:
automatically determine, by one or more processors of the computer system, if code of the proposed application matches one or more suspicious code sequences, and if so, flag the proposed application for a manual review by a human curator before listing the proposed application in the marketplace, and
if the code of the proposed application does not match the one or more suspicious code sequences and if the permissions do not match the one or more predetermined permissions, then to list the proposed application in the marketplace without manual review of the application.

13. An apparatus comprising:
one or more memory devices arranged and configured to store executable code; and
one or more processors operably coupled to the one or more memory devices, the processors being arranged and configured to execute the code such that the apparatus performs the actions of:

providing an online marketplace to developers of executable installable software applications that may be downloaded from the marketplace to a client computing device for execution by the client device;

receiving a request from a party to the marketplace to list a proposed executable installable software application for sale in the marketplace;

automatically determining the permissions requested by the proposed application;

automatically determining if the permissions match one or more predetermined permissions, and
- if a match is determined, flagging the proposed application for manual review by a human curator to determine whether the proposed application includes malicious code before listing the proposed application in the marketplace, and
- if a match is not determined, listing the proposed application in the marketplace without manual review of the proposed application.

14. The apparatus of claim 13, wherein the one or more predetermined permissions includes a permission to run native code as part of the execution of the application.

15. The apparatus of claim 13, wherein the one or more predetermined permissions includes a local hardware access permission.

16. The apparatus of claim 13, wherein the manual review by a human curator includes manually running the proposed application and checking for malicious effects of the proposed application on a client device running the proposed application.

* * * * *